United States Patent [19]
Brown et al.

[11] Patent Number: 6,158,066
[45] Date of Patent: Dec. 12, 2000

[54] ANTI-ROTATION PIPE LOCATOR AND HOLDER

[75] Inventors: Larry D. Brown, San Diego; Kirt R. Hubbard, Escondido, both of Calif.

[73] Assignee: Securus, Inc., San Marcos, Calif.

[21] Appl. No.: 08/841,144

[22] Filed: Apr. 24, 1997

[51] Int. Cl.[7] .................................................... E03C 1/06
[52] U.S. Cl. ................................................................ 4/695
[58] Field of Search ................................ 4/695; 248/56, 248/57

[56] References Cited

U.S. PATENT DOCUMENTS

| | | | |
|---|---|---|---|
| 3,009,167 | 11/1961 | Leonard, Jr. | 4/695 |
| 3,481,571 | 12/1969 | Lauckner | 248/57 |
| 3,866,871 | 2/1975 | Dupuy, Sr. | 248/59 |
| 4,550,451 | 11/1985 | Hubbard | 4/695 |
| 4,907,766 | 3/1990 | Rinderer | 248/57 |
| 5,050,824 | 9/1991 | Hubbard | 248/57 |
| 5,154,375 | 10/1992 | Condon | 248/73 |

OTHER PUBLICATIONS

Holdrite Brochure entitled *Pipe Positioning and Alignment Brackets*, 17 pgs, no date.

*Primary Examiner*—Robert M. Fetsuga
*Attorney, Agent, or Firm*—Stetina Brunda Garred & Brucker

[57] ABSTRACT

An anti-rotation pipe locating and support device comprises a support and insert assembly that precisely locates and supports plumbing pipes relative to the structure of a building and prevents rotational movement of the pipes relative to the support. The support includes a support that can be fastened to the building structure and has one or more support openings for receiving the pipes. Inserts are used to receive and grip the pipes to secure them within the support openings with or without additional fastening techniques. Each support opening has at least one small tab which forms a lock with a slot provided in the insert, or is shaped to cooperate with a non-circular opening in the support to restrain the insert. The lock prevents the insert and pipe from rotating inside the support opening. The support and insert assembly also prevents lateral, vertical, and axial movement of the pipe relative to the support by constraints provided between the support and the insert.

43 Claims, 11 Drawing Sheets

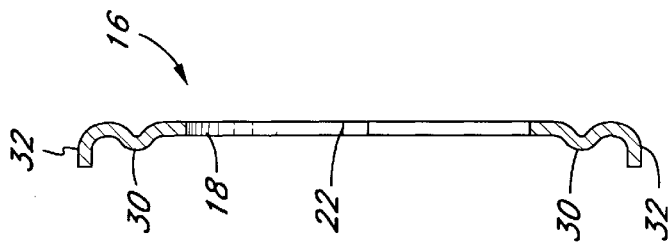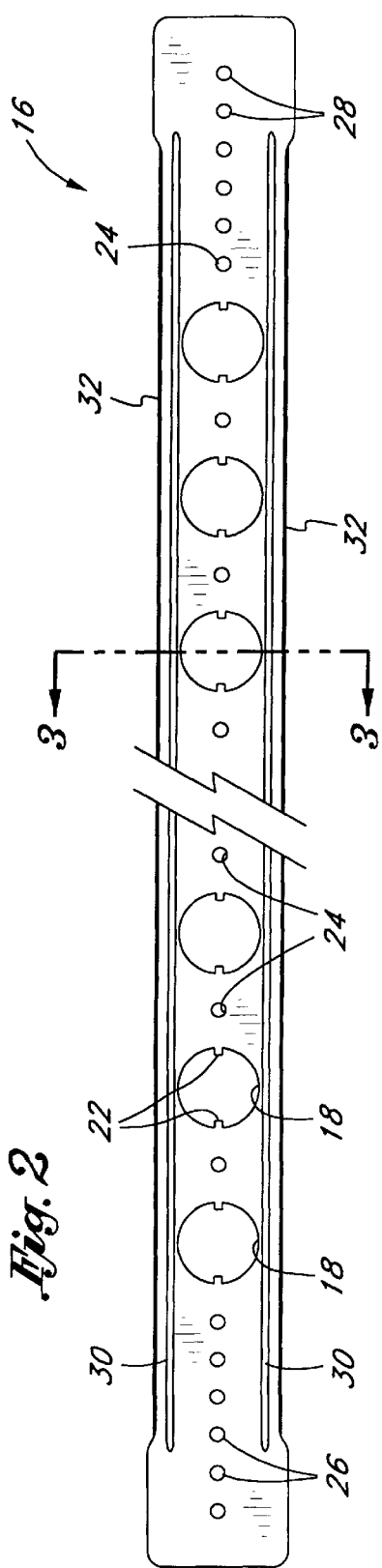

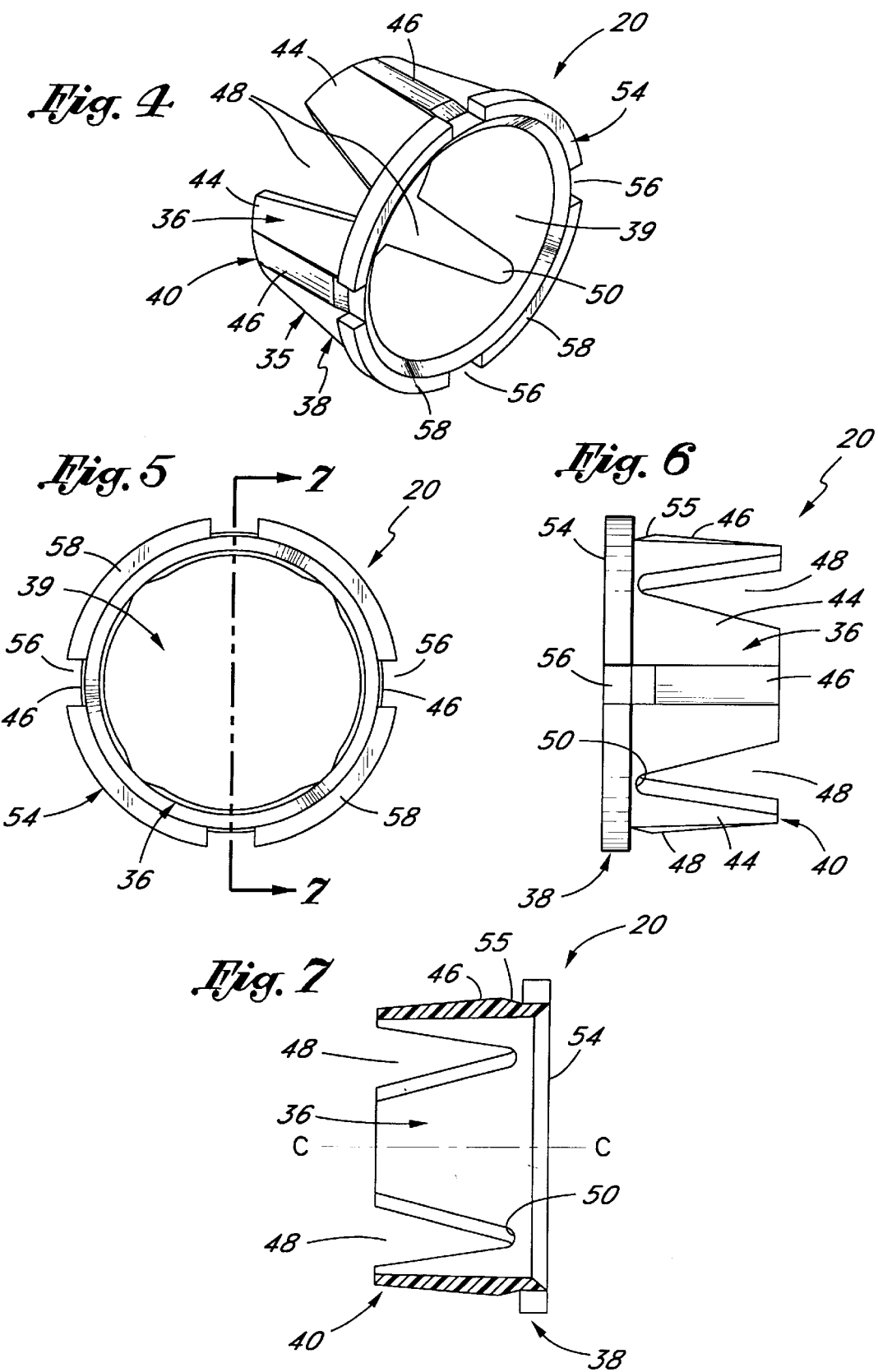

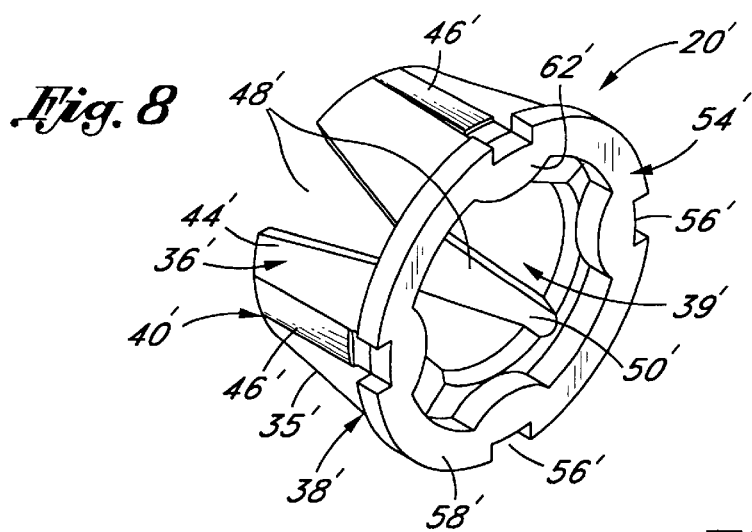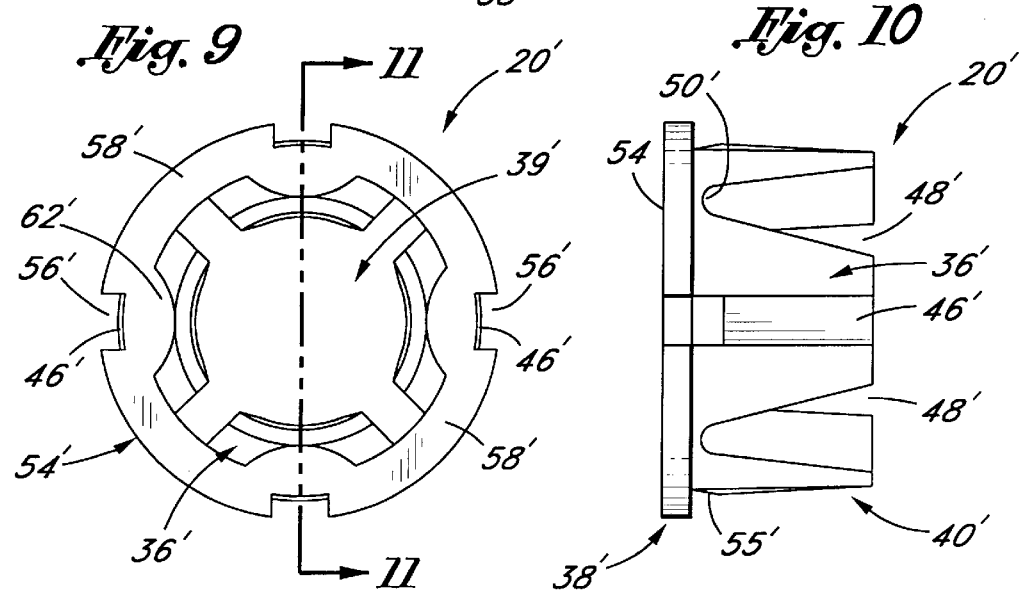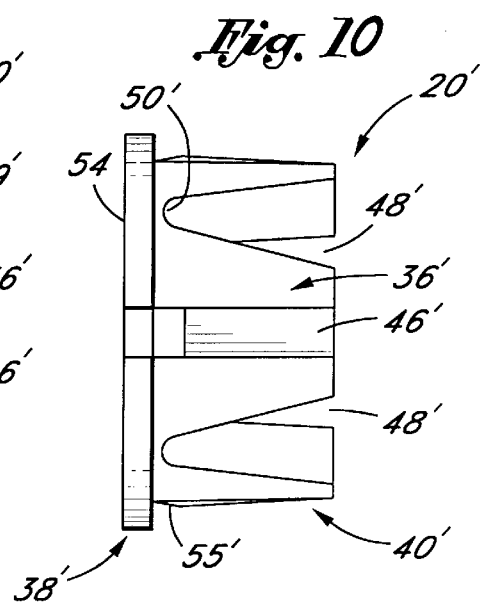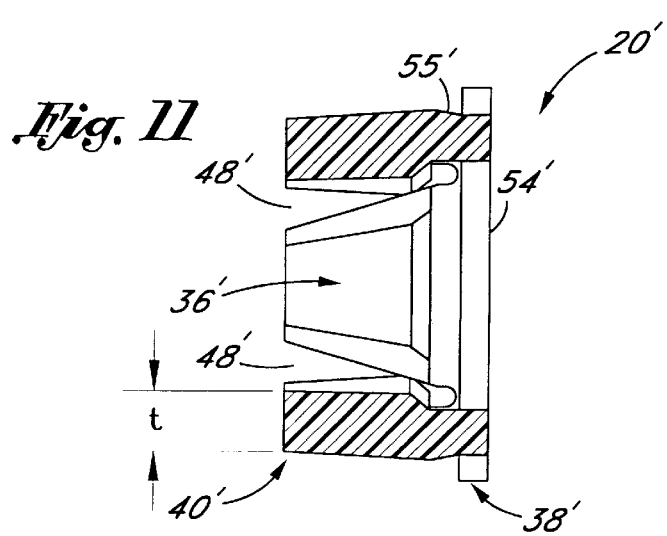

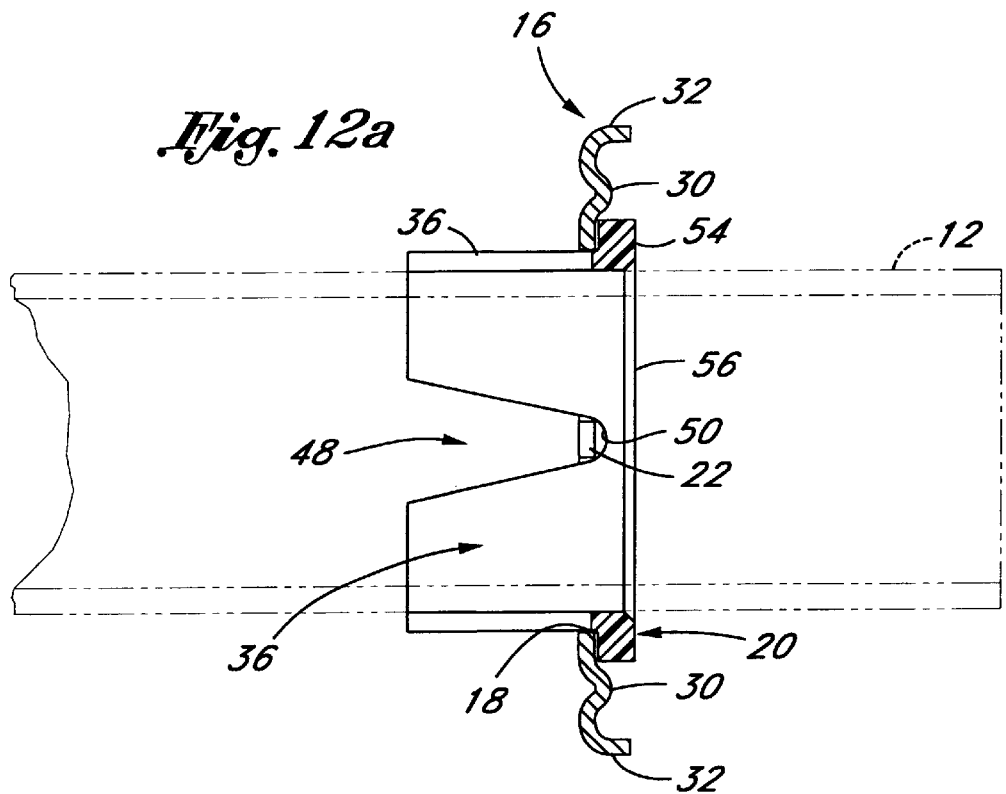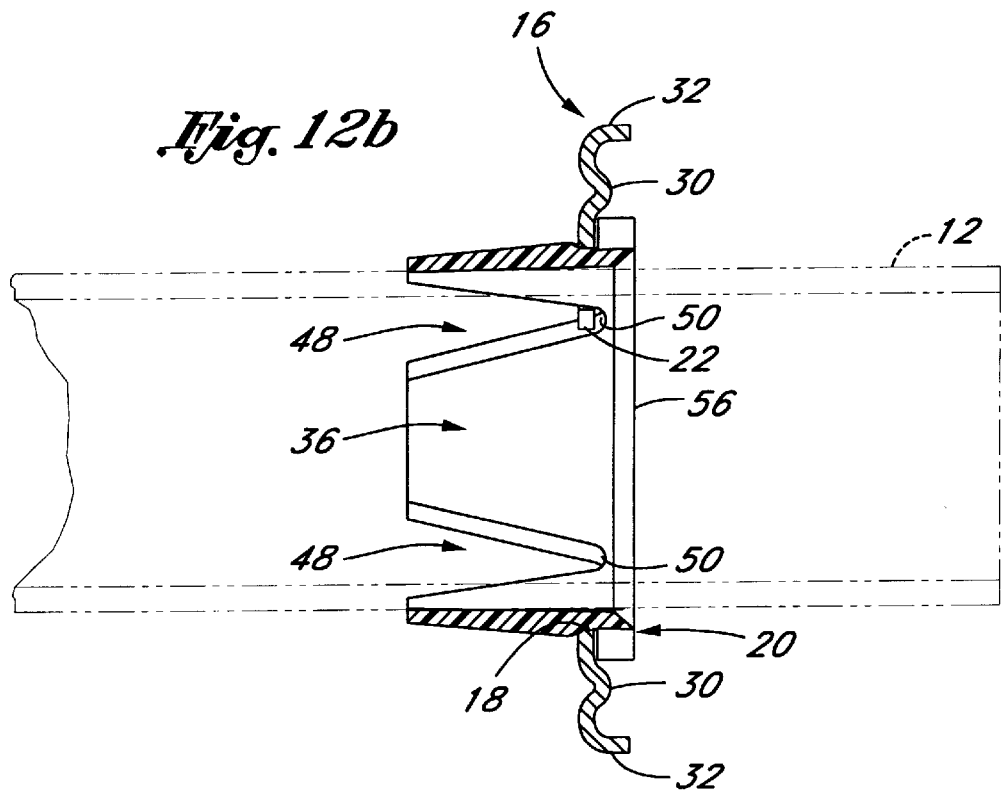

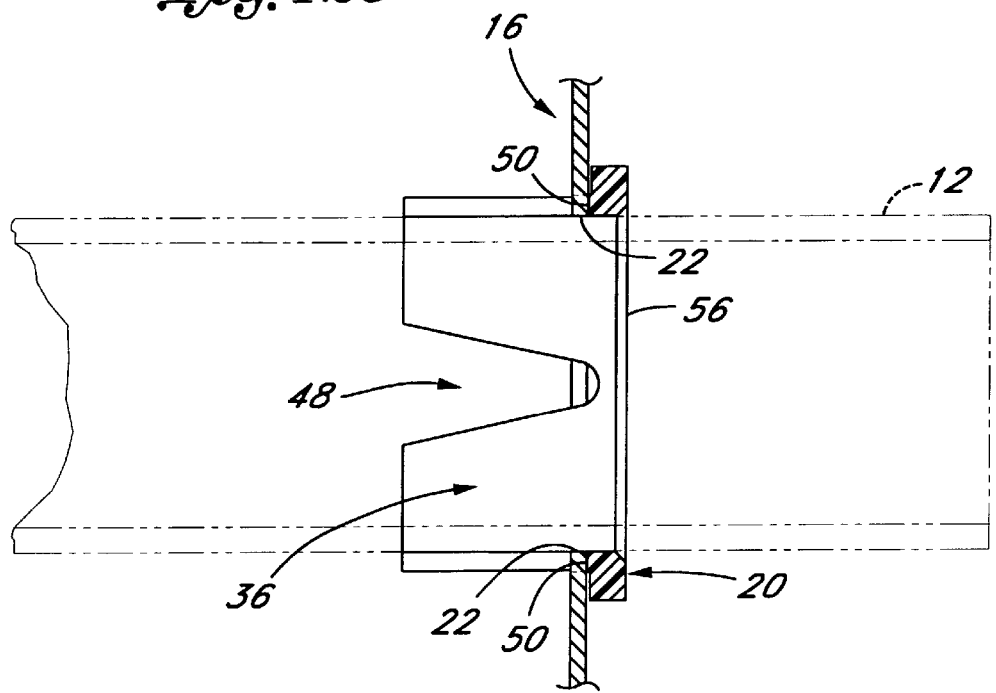

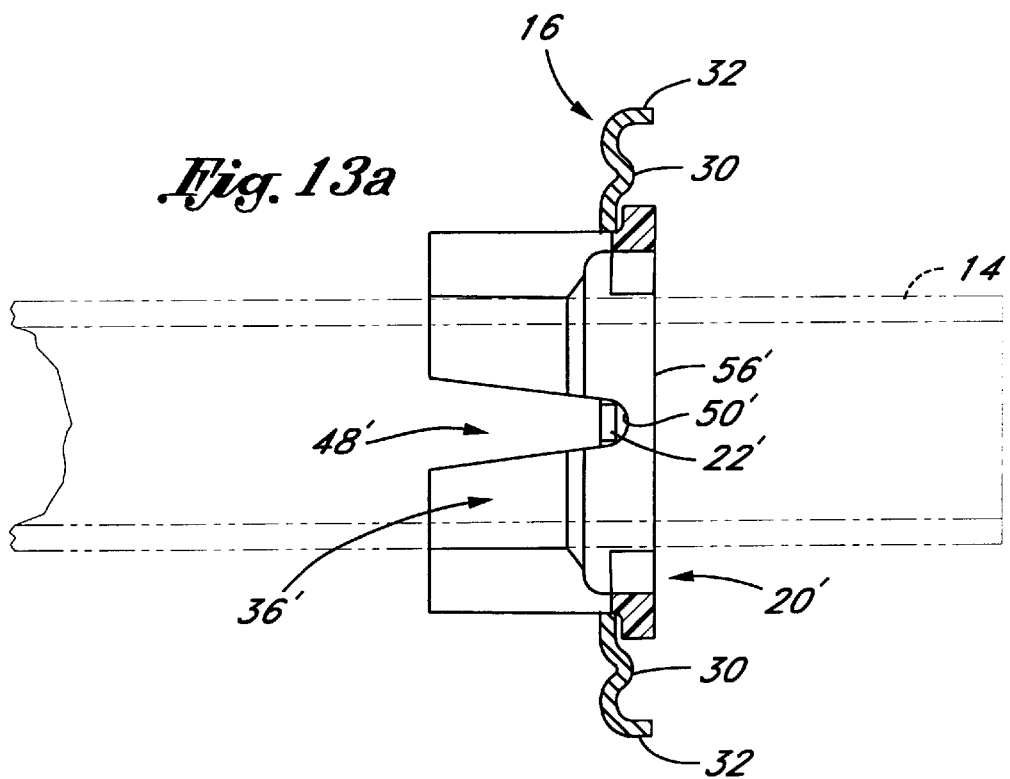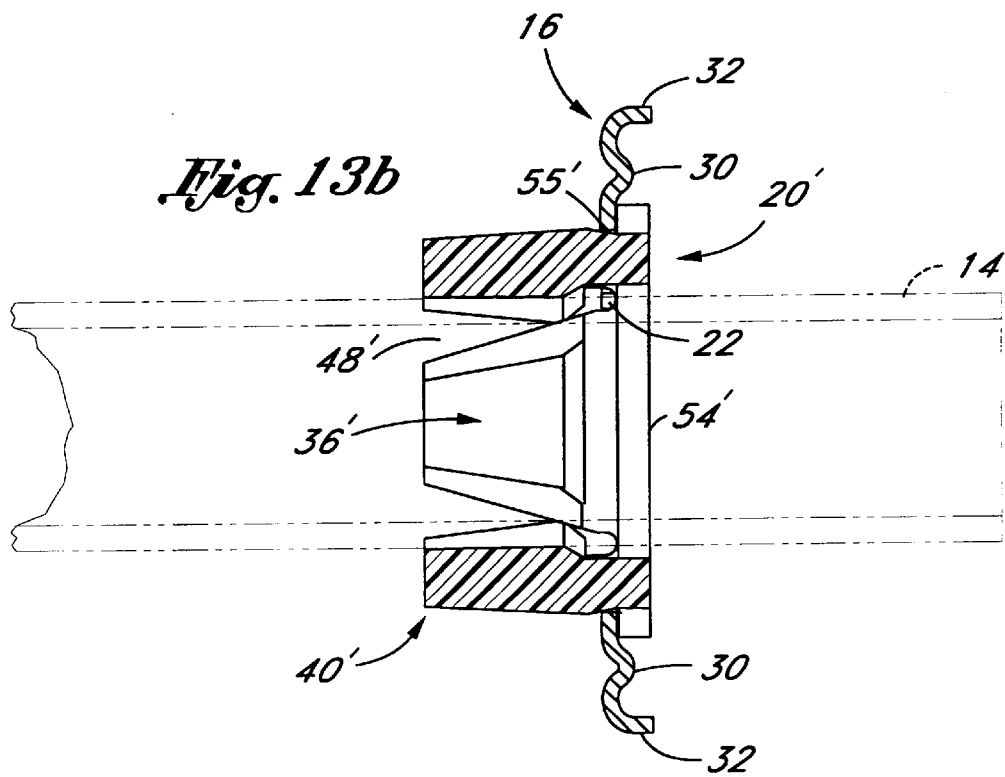

ANTI-ROTATION PIPE LOCATOR AND HOLDER

FIELD OF THE INVENTION

This invention relates to plumbing fittings, and in particular to a universal, anti-rotation plumbing pipe locator for holding pipes in a desired spatial relationship.

BACKGROUND OF THE INVENTION

Pipes adapted to mate with a plumbing fixture such as a sink or the like typically extend upwardly between building studs and project outwardly for connection to the plumbing fixture through fixture inlets. The pipes are preferably secured in place to prevent axial movement parallel to the pipes, rotation around the pipes, vertical movement upwardly and downwardly, and lateral movement sideways during use. The pipes are also preferably located a predetermined distance apart from each other for precise alignment with fixture inlets that are typically pre-formed in the plumbing fixtures.

Traditional methods of securing pipes between studs use complex hardware such as bolted elbows, threaded fittings, or universal supporting bars. As a result, a plumber must manipulate specialized fasteners or the like to attach specialized fittings to building studs or similar structures to hold the pipes in place. U.S. Pat. No. 4,550,451, which is incorporated herein by reference, discloses a simple universal device for locating and holding pipes in building structures.

One device disclosed in the '451 patent includes a support for holding the pipes and inserts for locating the pipes to prevent vertical, lateral, and axial movements of the pipes. The support is a strap having a plurality of openings for receiving the pipes. The strap is typically fastened to the studs by nails or screws. The inserts are disposed within the strap openings and cooperate with the openings such that the inserts do not move relative to the openings in the vertical, lateral, or axial direction. The inserts include apertures that are configured to receive the pipes therethrough and to tightly grip the pipes to prevent vertical, lateral, and axial movements of the pipes. But the '451 patent does not necessarily prevent rotational movement of the pipes relative to the device. Thus, the pipes are sometimes glued or soldered to the insert and support in order to prevent rotation.

SUMMARY OF THE INVENTION

Eliminating rotational movement of the pipes during use is desirable to further increase structural stability and ensure integrity of the pipes. There is therefore a need for a simple universal device for holding and precisely locating pipes relative to a structure to prevent vertical, lateral, rotational, and axial movements of the pipes during use without the need for complex hardware.

This invention provides a method and device for holding and locating pipes in building structures. The device comprises a strap fastenable to a building structure and having one or more openings in the strap, and if plural openings are provided they are advantageously spaced at preset distances. Each of the strap opening has at least one tab protruding from the edge of the opening toward the interior of the opening. An insert is placed into the opening. The insert has a skirt with distal and proximal ends and a flange at the proximal end. The flange is larger than the strap opening. The skirt and flange define an insert aperture sized to accept a pipe inserted through the insert aperture. One end of the insert is inserted through the strap opening. The insert has at least one slot with sides configured to engage the tab or tabs on the strap to prevent the insert from rotational movement relative to the tab or tabs.

Advantageously, the distal end of the skirt is resiliently movable in a radial direction to restrain movement of the insert relative to the strap in at least one direction substantially parallel to a longitudinal axis of the pipe extending through the strap opening. Further, the insert aperture is preferably circular and has an inner diameter at the proximal end approximately equal to the outer diameter of the pipe insertable through the insert aperture. In the preferred embodiment, the skirt has four slots disposed between four prongs, with each prong configured to form the sides of the slot that engage the tab to prevent the insert from rotational movement relative to the tab. The skirt advantageously has a thickness that is selected to define an insert aperture corresponding to a pipe with a predetermined diameter, where the thickness is varied to accommodate varying pipe diameters. Advantageously, the aperture at the distal end is advantageously sized smaller than the pipe outer diameter, so the prongs are forced radially outward when the pipe passes through the skirt, thereby locking the insert axially within the strap opening.

There are thus provided a means for locating and holding a pipe in a building, including a strap with one or more openings for receiving and locating one or more pipes relative to a building structure. An insert means insertable into the openings is provided to hold the pipes in the strap, with the insert means having an anti-rotation means for constraining rotation of the insert relative to the strap about the longitudinal axis of the pipe as it extends through the opening.

There is also advantageously provided an insert suitable for use in the above described assembly, with the insert preferably made of plastic. The insert has a distal end and proximal end, and advantageously has a tapered cylindrical aperture extending along a longitudinal axis of the insert between the distal and proximal ends with the size of the aperture being selected to correspond to about the size of the plumbing pipe to be inserted into and held by the insert. The insert has at least one slot extending from the distal end toward the proximal end, with the end of the slot adjacent the proximal end of the insert being sufficiently large to accommodate the insertion of the tab on the strap into the slot so the tab and slot can cooperate to limit rotation of the insert about the longitudinal axis. The distal end of the insert is preferably movable in a radial direction relative to the longitudinal axis and sized so the distal end may be passed through the hole in the strap. The insert advantageously has at least first and second radially extending portions located on the insert so the portions are on opposite sides of the strap when the insert is installed in the hole in the strap to restrict motion of the insert along the longitudinal axis. Preferably, the distal end of the insert is resiliently deformable in the radial direction. Further, there are preferably a plurality of slots each of which has a closed end toward the proximal end of the insert and an open end at the distal end of the insert, and with the width of the slot at the distal end being greater than the width of the slot at the proximal end. This insert is advantageously inserted through the hole in the strap so the tab abuts the edges of the slot toward the proximal end of the insert.

There is also provided a strap suitable for the above combination. The strap preferably comprises a rectangular, flat strip with longitudinal edges generally parallel to a longitudinal axis of the strap, and a strengthening rib adjacent each of the edges. The strap advantageously has a length sufficient to position the pipe in a desired position relative to a structural member in a building, either by extending between two adjacent structural members or by extending from a single structural member. The strap having a first plurality of holes at predetermined distances along the length of the strap with the holes spaced to accommodate the location of plumbing pipes, and with the holes being sized to allow the passage of the plumbing pipes through the holes and to allow the passage of an insert and the passage of a pipe through the insert, all within the hole. The strap advantageously has at least one tab extending inward toward the center of one of the holes to engage the insert described above. Preferably, there are a plurality of tabs on a plurality of the first plurality of holes in the strap.

The present invention also comprises a method for locating and holding pipes in a building. The method comprises the step of fastening a strap to a building structure, where the strap has at least one strap opening, and advantageously has a plurality of openings spaced along the strap at preset distances, with each of the strap opening having at least one tab protruding from the edge of the opening toward the interior of the opening. The distal end of an insert is placed or inserted through the hole until a radially extending portion on the insert prevents further insertion of the insert through the hole, where the insert has a longitudinal axis with an aperture along that axis and an outer diameter configured to abut at least a portion of the hole through the strap to restrain movement of the insert orthogonal to the longitudinal axis. The tab is placed into a slot in the insert to restrain rotation of the insert about the longitudinal axis. The final step comprises inserting a pipe through the aperture in the insert so the pipe is held by the insert, and so that the pipe expands the insert to hold the insert from longitudinal movement, with the pipe insertion also cooperating with the tabs to stop the insert from rotating.

Advantageously, the step of inserting a pipe causes the distal end of the insert to expand and hold the pipe against rotation about the longitudinal axis. Preferably, the method further includes fastening the insert to the pipe, as for example by cement, solder, brazing, welding or threaded fasteners. Finally, the method comprises the step of varying the size of the aperture in the insert to correspond to pipes of different diameters.

One aspect of the present invention involves a plumbing device for holding and locating pipes in building structures. The plumbing device comprises a generally planar support strap and one or more inserts. The support strap has one or more strap openings and is configured to be fastened to the building structure, for example, by providing holes in the support strap through which nails can pass and attach to the structure or by providing tabs or tangs on the strap that can be embedded into the structure. The strap opening or openings are located to position the pipe in a predetermined location, and advantageously comprise a plurality of openings spaced at preset distances, which may be determined by the plumbing codes for attachment of plumbing fixtures. Each of the strap openings has at least one tab protruding from the edge of the opening toward the interior of the opening. Each of the inserts has a skirt defining a proximal end and a distal end. The proximal end has a flange whose outer diameter is desirably larger than the corresponding strap opening. The skirt and flange define an insert aperture through which the pipe is insertable and generally rigidly attachable. The distal end of the skirt is inserted through the strap openings and has at least one slot that extends generally toward the flange in an axial direction perpendicular to the support strap. The axial slot engages the tab of the strap opening to prevent the slot from rotating relative to the tab.

In accordance with another aspect of the present invention, a pipe locating and support device comprises a frame having one or more openings for receiving and spacing one or more pipes relative to a building structure. An insert cooperates with the openings in the frame into which pipes are inserted. The inserts have generally tubular walls that define insert apertures for receiving the pipes. Anti-rotation means constrain each pipe against rotation relative to the frame. Preferably, the anti-rotation means comprise tabs on the strap cooperating with an insert interposed between the pipe and the strap.

An additional aspect of the present invention involves a pipe locator and support device used in combination with spaced building studs and associated plumbing for precisely and rigidly fixing pipes in position relative to the studs. The locator and support device comprises a generally planar support strap having opposite faces and an elongated length with upper and lower edges. The strap includes a first plurality of longitudinally aligned openings along the length between the upper and lower edges. The openings are desirably spaced apart by a predetermined distance in which the pipes are alignable, for example, in accordance with plumbing codes. Each of these openings has at least one small tab protruding from the edge of the opening toward the interior of the opening. The strap additionally includes a second plurality of longitudinally aligned openings along the length between the upper and lower edges. These openings are spaced to receive fasteners to fasten the strap to the studs. The locator and holding device further comprises a means for fixing the pipes with in the first plurality of openings to fix the pipes in position for attachment to plumbing fixture conduits to prevent the pipes from rotating from the first plurality of openings. Alternatively, the openings may be formed in a flat metal strap cantilevered from a building structure, or the strap may be formed in to an "L" shaped bracket such that only one end of the strap is fastened to the building structure, with one or more openings to receive the insert and pipe.

In a broader sense this invention also comprises inserts with non-circular shapes cooperating with non-circular holes in the strap through which pipes are inserted in order to hold and locate pipes in building structures. The insert thus may have a longitudinal axis with a distal end configured to fit through one of the holes, and a proximal end with a projection extending in a direction orthogonal to the axis a distance sufficient to contact the strap and prevent the insert from passing through said one of the holes. The insert advantageously has a shape configured to cooperate with the non-circular periphery of the hole to restrain rotation of the insert relative to the strap in the plane containing the hole. The insert has a longitudinal cavity along the axis of sufficient size to allow passage of a selected one of the pipes.

The holes in the strap may advantageously be square, with the corresponding insert having an exterior configuration with at least one flat portion designed to cooperate with one side of the square hole to restrain rotation of the insert relative to the strap. Alternatively, the holes in the strap could have a tab extending toward the center of the holes, with the insert having a slot with edges configured and located to cooperate with the tab to restrain rotation of the insert relative to the strap when the insert is placed into the hole.

The strap advantageously has opposing edges and ends with a first plurality of non-circular holes spaced at predetermined distances along a portion of the strap. The strap has a length sufficient to extend between adjacent support members in a building. The strap is deformed along the length of one edge of the strap in order to stiffen the strap, and is preferably deformed along both edges to form stiffening ribs. The strap has flattened ends with a second plurality of holes in each of the ends sized to accommodate a fastener to fasten the strap to the building structure. The non-circular holes are configured according to the shape of the insert used.

This invention further comprises a method of locating and holding pipes in a building structure. The method comprises the steps of fastening a strap between structural supports in a building, where the strap is formed with a plurality of strap openings spaced along the strap at preset distances and formed with a plurality of the strap openings having at least one tab protruding into the opening toward the interior of the opening. A distal end of an insert is inserted through one of the holes with a tab until a radially extending portion toward the proximal end of the insert abuts the strap and prevents further insertion of the insert through the hole, the insert having a longitudinal axis with an aperture along that axis. The tab is placed on the hole through which the insert is inserted into a slot in the insert to restrain rotation of the insert about the longitudinal axis. Preferably, the step of inserting the pipe further comprises radially expanding a portion of the insert so the distal end of the insert will not pass through the hole through which the insert was inserted.

Advantageously, the method also comprises the further step of inserting a pipe through the aperture in the insert, and configuring the aperture in the insert to be about the same size as or slightly larger than an outer diameter of the pipe. Preferably, the method comprises the further steps of fastening the pipe to the insert, and varying the thickness of the insert to accommodate pipes of different diameters.

The method also includes the process of forming a plurality of holes in the strap with at least one non-circular hole. An insert is formed with a longitudinal axis and a distal end configured to fit through the non-circular hole. A projection is formed on the proximal end of the insert with the projection extending in a direction orthogonal to the axis a distance sufficient to contact the strap and prevent the insert from passing through said one of the holes. The shape of the insert is selected to cooperate with the non-circular periphery of the hole to restrain rotation of the insert relative to the strap in the plane containing the hole. A longitudinal cavity is formed along the axis and of sufficient size to allow passage of the pipes. The final step comprises placing the insert on the pipe to interpose the insert between the pipe and the strap.

Advantageously the non-circular holes are formed to be square and the insert is formed with an exterior configuration having at least one flat portion configured to cooperate with one side of the square to restrain rotation of the insert relative to the strap when the insert is placed into the square hole. Alternatively, the non-circular hole may be formed to have a tab extending toward the center of the hole and the insert formed with a slot opening to the distal end and extending toward the proximal end, with the slot edges configured and located to cooperate with the tab to restrain rotation of the insert relative to the strap when the insert is placed into said one of the holes.

BRIEF DESCRIPTION OF THE DRAWINGS

These and other features of the invention will now be described with reference to the drawings of a preferred embodiment which is intended to illustrate and not to limit the invention, and in which:

FIG. 2 is a front elevational view of a support having lateral holes for locating and holding the pipes.

FIG. 3 is a side cross-sectional view of the support of FIG. 2 taken along line 3—3.

FIG. 4 is a front perspective view of an insert of the locator and support device of FIG. 1 configured in accordance with a preferred embodiment of the present invention.

FIG. 5 is a front elevational view of the insert of FIG. 4.

FIG. 6 is a side elevational view of the insert of FIG. 4.

FIG. 7 is a side cross-sectional view of the insert of FIG. 4 taken along line 7—7.

FIG. 8 is a front perspective view of an insert which is configured in accordance with another preferred embodiment of the present invention and is adapted to fit within the support of FIG. 2.

FIG. 9 is a front elevational view of the insert of FIG. 8.

FIG. 10 is a side elevational view of the insert of FIG. 8.

FIG. 11 is a side cross-sectional view of the insert of FIG. 9 taken along line 11—11.

FIG. 12 is a side cross-sectional view of the insert of FIG. 4 fitted into a lateral hole of the support of FIG. 2 taken along line 12—12 of FIG. 1.

FIG. 13 is a side cross-sectional view of the insert of FIG. 8 fitted into an opening of the strap of FIG. 2 taken along line 13—13 of FIG. 1.

DETAILED DESCRIPTION OF THE PREFERRED EMBODIMENTS

Figure 1A:
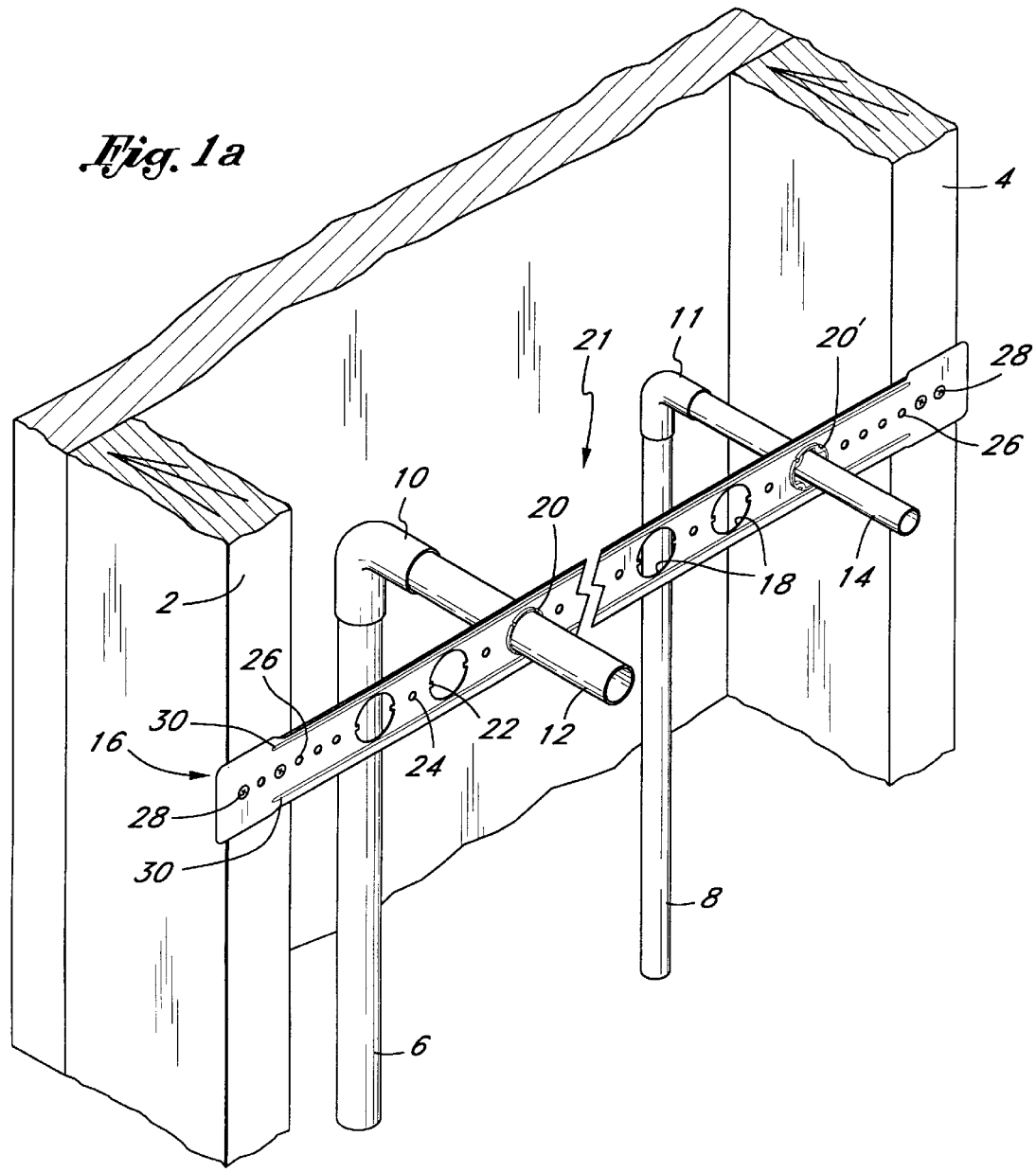
FIG. 1 is a perspective view of the present universal pipe locator and holding device for locating and aligning pipes with respect to a plumbing fixture (not shown).
Figure 1B:
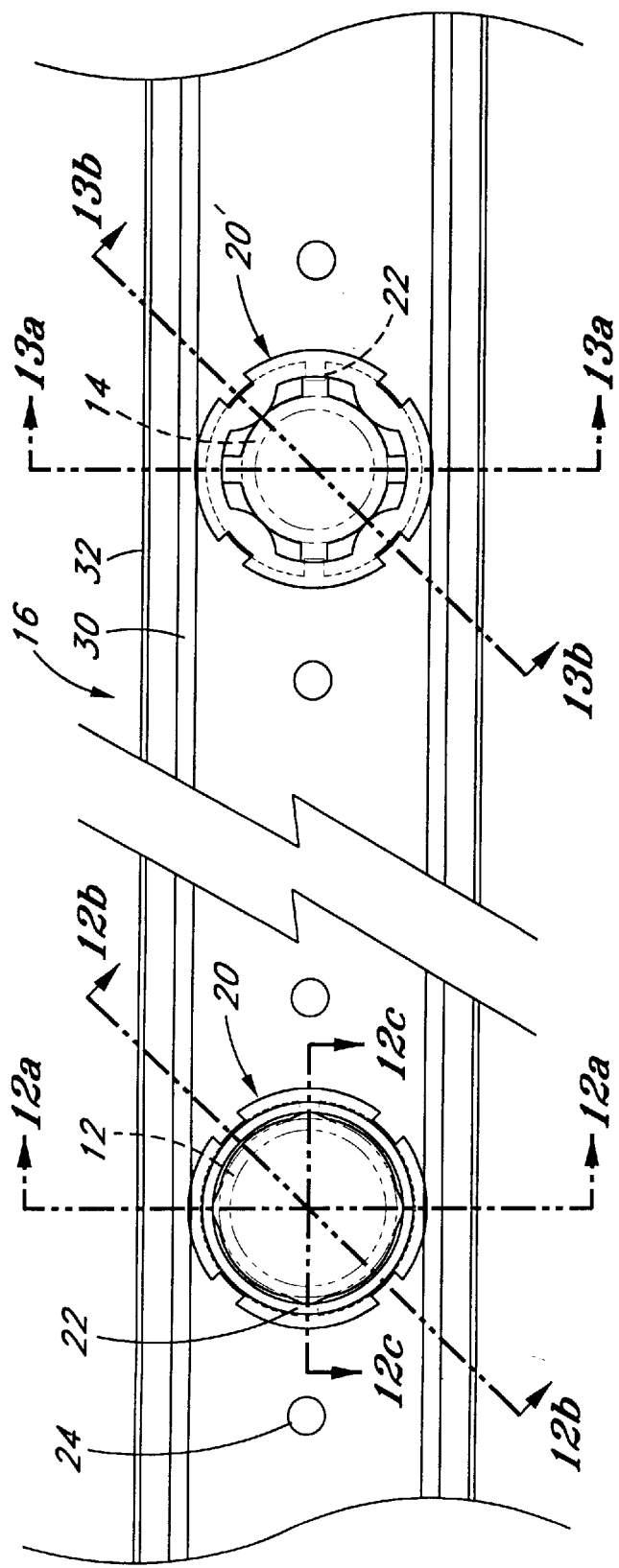

As illustrated in FIG. 1, a typical building structure has a plurality of vertically oriented wooden studs spaced apart at a standard interval. A pair of such studs 2, 4 are illustrated. For purposes of this discussion, the axial direction is defined as generally parallel to the pipes 12 and 14 that extend from the wall containing studs 2, 4. The lateral direction is defined as perpendicular to the axial direction and also perpendicular to the studs 2 and 4. The vertical direction is defined as perpendicular to both the axial direction and the lateral direction, and is generally parallel to the pipes 6, 8 and studs 2, 4, as depicted in FIG. 1.

Typically, vertical runs 6 and 8 of hot and cold water pipes are located between the studs 2, 4, and are coupled to elbows 10 and 11, respectively. The elbows 10 and 11 mount horizontal runs or pipes 12 and 14 which project horizontally and inwardly or toward the interior of the building.

The pipes 12, 14 are typically made of plastic, but also may be metal. The pipes 12, 14 generally need to be properly located in position for attachment to a pair of fittings such as hot and cold water handles (not shown) of a fixture, such as a sink, bathtub, or shower. The pipes 12, 14 are advantageously fixed generally against lateral, vertical, axial, and rotational movements during use.

As shown in FIG. 1, a support or frame 16 is attached to the studs 2 and 4 and has a plurality of strap openings 18 through which the horizontal pipes 12 and 14 are disposed. To constrain the pipes 12 and 14 against vertical, lateral, rotational, and axial movements, inserts 20 and 20' cooperate with the strap openings 18 and with the exterior of the pipes 12 and 14. The support 16 and inserts 20, 20' illustrate preferred embodiments of the pipe locating and holding device 21 of this invention.

Referring to FIGS. 1 and 2, the support 16 is generally planar and includes the plurality of openings, holes or apertures 18 that are longitudinally spaced apart at predetermined distances. The openings 18 are advantageously equally spaced along the length of the strap 16 such that a pair of the openings 18 will accept pipes 12 and 14 at distances facilitating attachment to the fixture conduits (not shown). In the illustrated embodiment, the center of each opening 18 is generally two inches from the center of the adjacent opening 18. Plumbing codes permit various standard spacings between the conduits of plumbing fixtures such as sinks. Accordingly, the spacing or distance between the pipes 12 and 14 need not be this distance, but are generally spaced some predetermined distance apart, such as equal distances on opposite sides of a waste pipe (not shown, but located between pipes 12 and 14).

The openings 18 shown in FIGS. 1 and 2 have a generally circular shape, but are actually non-circular because of tabs 22. The openings 18 have a diameter larger than the outer diameter of the pipes 12, 14. The strap openings 18 are more desirably about equal in size. Along the edge of each opening 18 is desirably disposed at least one tab 22. The tab 22 has a generally flat rectangular or square shape, protrudes radially toward the center of the strap opening 18, and is sufficiently small so that it will not contact the pipe 12, 14 through the openings 18. In a further embodiment with more than one tab 22, the tabs 22 are advantageously spaced evenly apart from each other along the circumference of the opening 18. For instance, an opening 18 may have two tabs 22 arranged about 180 degrees apart, as shown in FIGS. 1 and 2.

In the embodiment shown in FIGS. 1 and 2, the strap openings 18 on the strap 16 alternate with a plurality of alternating holes 24. The holes 24 are longitudinally spaced apart, desirably at predetermined equal distances. A plurality of edge holes 26 on the strap 16 are located at each end of the strap 16. The alternating holes 24 and edge holes 26 are preferably sized to cooperate with attaching components such as nails, screws, and fasteners 28 for attachment of the strap 16 onto other structures such as the studs 2 and 4. In addition, other attachment methods may be used, such as the use of adhesives and welding.

In FIGS. 1 and 2, there are desirably two longitudinal ribs 30 running generally along the length of strap 16, one on each side of the strap openings 18. The ribs 30 advantageously increase the longitudinal rigidity and strength of the strap 16. The longitudinal ribs 30 are best illustrated in the cross-section view of strap 16 in FIG. 3. The ribs 30 may be formed by stamping along longitudinal edges 32 of the strap 16. To further increase the longitudinal stiffness of the strap 16, the longitudinal edges 32 are slightly curled to form a channel cross section with a depending flange. The depth of the ribs 30 and curled edges 32 is generally shallow, as reflected in FIG. 3, and advantageously less than five times the thickness of the strap 16.

In the exemplary embodiment, the length of strap 16 is generally longer than the distance between two adjacent building studs 2 and 4. In one embodiment, the strap 16 is about 26 inches long for standard building stud spacings. In another embodiment, the strap 16 is about 20 inches long. The width of the strap 16 is typically about 1.75 inches for standard pipes sizes and is about 0.04 inches thick. The strap openings 18 advantageously each have the same diameter of about 1 inch. The tabs 22 are desirably about 0.075 inch in width and extend inwardly toward the center of the strap openings 18 with a length of about 0.04 inch.

To fasten the strap 16 to structures such as the studs 2 and 4 shown in FIG. 1, the alternating holes 24 may be used. For example, the alternating holes 24 can allow nails to be used to fasten the strap to adjacent structures (not shown). Preferably, the distance between adjacent holes 24 is equal to or less than the width of studs 2 and 4 to ensure that some of the alternating holes 24 overlie the studs 2 and 4 regardless of the location of pipes 12 and 14. The edge holes 26 may also receive fasteners 28 to attach the strap 16 to the studs 2 and 4, as illustrated in FIG. 1. The edge holes 26 are advantageously spaced closer together than are the alternating holes 24, and preferably spaced so that several holes 26 cover the width of a single stud 2, 4, as illustrated in FIG. 1. The plurality of edge holes 26 advantageously allows the strap 16 to be used for the studs 2 and 4 spaced at varying widths.

The support 16 advantageously is relatively inexpensive to produce since it can be stamped in predetermined lengths out of flat metal sheet stock or made of a plastic such as polyvinyl chloride. Other suitable materials, for instance, include copper, aluminum, or mild steel plate with a protective coating such as copper or zinc. As discussed below, the strap 16 are used in conjunction with inserts 20, 20' to hold pipes 12, 14 having a range of diameters.

Referring to FIGS. 1 and 4–7, the insert 20 is configured to hold the pipe 12, with a smaller outer diameter pipe 14 held by the insert 20' shown in FIGS. 1 and 8–11. It will be understood that inserts 20 of varying sizes can be designed to accommodate differently sized pipes (e.g., 12, 14) and strap openings 18. FIGS. 4–11 therefore merely illustrate specific embodiments to hold and locate the pipes 12, 14.

As shown in FIGS. 1, 4–7, and 8–11, the inserts 20, 20' are generally circular in exterior shape with generally tubular walls 35, 35'. Because the two inserts 20, 20' are similar in construction, only the insert 20 will be described for purposes of this discussion.

The insert 20 has a tubular skirt or sleeve 36 that is desirably tapered slightly from a generally circular proximal end 38 (FIG. 6) inwardly to a generally circular distal or outer end 40. The skirt or sleeve 36 is curved with an inner diameter about the same as, or slightly larger than, the outer diameter of pipe 12. The skirt 36 defines a insert opening or aperture 39 (FIG. 5) through which the pipe 12 is inserted. Advantageously the proximal end 38 has a larger inner diameter than the distal end 40. The inner diameter at the proximal end 38 is preferably equal to or slightly larger than the outer diameter of the pipe 12 to be held by the insert 20. The distal end 40 is advantageously smaller than the outer diameter of pipe 12 so that the pipe 12 expands the skirt 36 upon insertion to lock the insert 20 into position within the hole.

The skirt 36 desirably has at least one prong or leg 44 (FIG. 4) that is curved with a width at the proximal end 38 larger than the width at the distal end 40. As best seen in FIG. 4, the illustrated embodiment has four prongs 44 of about equal sizes equally distributed along the circumference of the skirt 36. There is one latch or engagement protrusion 46 on the outer surface of the skit 36 generally running the length of the skirt 36. The protrusion 46 may also be though of as an external rib. Preferably, there is a generally rectangular, longitudinal ramped protrusion 46 on the outer surface of each of the four prongs 44, desirably along the centerline of each prong 44. The thickness of the protrusion 46 is substantially zero near the distal end 40 of the skirt 36 and gradually increases towards the proximal end 38 to a maximum thickness at a location spaced from the proximal end 38 of the insert 20.

Each pair of adjacent prongs 44 is separated by a slot or cutout 48 oriented generally parallel to the central axis c—c (FIG. 7) of the insert 20. Each slot 48 has generally an arch shape with its rounded apex 50 pointing toward and spaced from the proximal end 38 of the insert 20, as best seen in FIGS. 4 and 6. The number of the slots 48 is governed by the number of tabs 22 in the strap opening 18 with which the insert 20 cooperates. The number of the slots 48 is desirably equal to or more than the number of corresponding tabs 22.

As shown in FIG. 4, the insert 20 has a flange or ring 54 at the proximal end 38 of the insert 20 connected to the skirt 36. The flange 54 shown is generally circular with an outer diameter larger than the largest outer diameter of the skirt 36. The outer diameter of the flange 54 is desirably larger than the diameter of the corresponding strap opening 18 on the strap 16 shown in FIGS. 1 and 2. Advantageously, the flange 54 includes at least one groove or notch 56 disposed adjacent each projection 46. As a result, the flange 54 may be formed by a plurality of arcs 58 distributed around the circumference of the proximal end 38 of the insert 20 and separated by a plurality of notches or grooves 56. This also makes it easier to mold the parts of plastic.

As best seen in FIGS. 5, 7 for the insert 20 and FIGS. 9, 11 for the insert 20', for a given size strap opening 18, the pipes 12, 14 of different outer diameters can be accommodated by varying the thickness of the skirt 36, 36' to obtain different inner diameters to cooperate with the outer surface of the pipes 12, 14. The insert 20 has a thinner skirt 36 than the skirt 36' of the insert 20'. The thinner skirt 36 can accommodate a pipe 12 having a larger outer diameter than pipe 14, while the thicker skirt 20' accommodates the smaller diameter pipe 14. The skirt 36 of the insert 20 desirably has a generally uniform thickness from the proximal end 38 to the distal end 40 of the insert 20 as shown in FIGS. 6 and 7, with the latch or projection 46 causing a local variation in the thickness on the outer diameter at the projection 46.

This local thickness variation from the latch 46 comprises a radially thicker portion adjacent the flange 54 but separated from the flange 54 by a ramp 55. The cross-sectional thickness of the latch or projection 46 corresponds to the thickness of the skirt 36 at the distal end 40. This thickness increases uniformly as the latch 46 approaches the proximal end 38. Shortly before the proximal end 38 the thickness of latch 46 tapers to form ramp 55 that tapers uniformly until it has about the same thickness as the skirt 36 adjacent flange 54. Alternately described, the notch 55 comprises a portion of latch or projection 46 that tapers radially inward and toward the flange 54 to form an declined surface toward the flange 54. The latch or projection 46 thus has one end tapering radially inward toward distal end 40 and another end (Ramp 55) tapering radially inward toward flange 54. The length of ramp 55 is preferably greater than the thickness of the strap 16 so that when installed the ramp 55 urges the flange 54 against the strap 16. The gaps or openings 56 open into the ramp 55 and allow the double tapered projection 46 to be molded.

FIGS. 8–11 show a further embodiment especially suitable to hold smaller diameter pipes, with the prime symbol (') being used to designate parts corresponding to those previously described. The skirt 36' advantageously has generally uniform thickness from the distal end 40' of the insert 20' to a position spaced from the proximal end 38', and then tapers toward the proximal end 38' of the insert 20' to a smaller thickness, as best seen in FIGS. 8 and 11. FIG. 11 also shows the ramp 46' and thus the outer portion appears to vary in thickness, but does so only at the location of ramps 46'. A ramp 55' corresponding in construction and location to ramp 55 (FIG. 7), is also preferably formed. Reinforcement portions 62 are provided at the inner surface of the flange 54' adjacent the grooves 56' to maintain strength and rigidity at the proximal end 38'. The thickness of the skirt 36' is varied to grip and hold pipes 12, 14 (FIG. 1) that are much smaller in size than the holes 22. Varying thickness of the skirt 36' advantageously reduces the material necessary to form the insert 20' and provide the small inner diameter to hold the pipe 14. Each of the prongs 44' is separated by a slot or cutout 48' that has a narrow, preferably curved end 50' adjacent proximal end 38' with the slot or cutout 48' widening toward the distal end 40'. Thus, the skirt 36, 36' has a plurality of longitudinally aligned slots or cutouts 48' that allow the distal end of the skirt to resiliently bend radially inward.

The length of the skirt 36, 36' preferably provides sufficient support for the pipe 12, 14 but is not longer than necessary to achieve efficiency and cost-effectiveness. In the exemplary embodiment shown, the inserts 20, 20' for holding the pipes 12, 14 have respectively an inner diameter of about $13/16$ inch and $9/16$ inch to receive the pipes 12, 14 of approximately the same respective outer diameter. The material of the inserts 20, 20' is preferably a plastic such as polyethylene. A plastic such as polyvinyl chloride could also be used to allow the inserts 20, 20' to be bonded to the pipe 12, 14. The plastic inserts 20, 20' may be made by injection molding or other molding techniques.

FIGS. 12a, 12b show the assembly of the insert 20 with the support 16 to form the pipe locating and holding device 21 (FIG. 1), with the pipe 12 illustrated in phantom. When not installed on a pipe 12, the interior of the skirt 36 preferably tapers toward the interior of the insert 20, with the proximal end by flange 54 being slightly larger in diameter than the distal end, as reflected in FIG. 12b where the pipe is shown in phantom but the insert 20 is shown in its un-deformed and un-installed form. When the pipe 12 is installed, the interior of the skirt 36 abuts the pipe 12 as reflected in FIGS. 12a and 12c and is forced radially outward into the configuration shown in those figures.

The notches 48 in insert 20 cooperate with the skirt 36 to enable the skirt 36 to be inwardly squeezed and passed into the strap opening 18 that is sized to receive the insert 20 tightly in position. The projections 46 guide the insert 20 through the strap opening 18 until the flange 54 of the insert 20 rests on one face of strap 16 and the projections 46 near the proximal end 38 abut the opposite face of strap 16, thereby securing the insert 20 in the strap opening 18 of the strap 16.

The flange 54 and the webs 46 grip the insert 20 onto the two opposing faces of the strap 16 and prevent axial movement between the insert 20 and the strap 16. The tight fit between strap opening 18 and the skirt 36 prevents vertical and lateral movement of the insert 20 relative to the strap 16.

The skirt 36 is also preferably sufficiently resilient that the projections 46 are resiliently urged radially outward to engage the edges of opening 18. There is thus advantageously provided a cylindrical insert 20 with slots opening into the distal end 40 of the insert to form notches 48 that define projections 46 that may be resiliently deformed radially inward when inserted into opening 18, yet resiliently expand to engage the edges of opening 18.

To provide a rotational constraint, the slots or notches 48 of the insert 20 preferably cooperate with the tabs 22 disposed at the strap opening 18 of the strap 16. The slots 48 are desirably sized to entrap the tabs 22 of the strap opening 18 and form a tight constraint against rotational movement between the slots 48 and the tabs 22, and thus between the insert 20 and the strap 16. The slots 48 are advantageously tapered so the slot 48 narrows toward the proximal end to cooperate with the tabs 22 and orientate the insert 20 relative to the tabs 22, so the tabs 22 end up at the narrow, proximal end of slots 48. With the tabs 22 in the narrow end of the slots 48, less rotation of insert 20 occurs before the tabs 22 abut the projections 44 and the rotation stops.

The pipe 12 is inserted through the insert aperture 39 of the insert 20 after the insert 20 is disposed and locked into place inside the strap opening 18 of the strap 16. Insertion of pipe 12 advantageously creates a tight fit with the insert 20 due to the small clearance, and further causes the skirt 36 to tightly engage the margins of the strap opening 18. The insert 20 may further be attached to the strap 16 by adhesive bonding, welding, brazing, threaded fasteners, or other means suitable to the materials for use with the materials from which insert 20 and support 16 are made.

In FIG. 13, the insert 20' with the skirt 36' having a smaller inner diameter is shown for holding the smaller diameter pipe 14. In this embodiment, the skirt thickness is increased so that the insert 20' may engage the same strap 16 having the same size strap opening 18 used with insert 20. The function of the insert 20' is similar to the function of the insert 20 just described.

From the foregoing it will be seen that the metal or plastic strap 16 of the pipe locating and holding device 21 is mounted onto the building structure utilized to snugly receive the plastic or metal insert 20, 20'. The slotted insert 20, 20' and strap tab 22 form a lock which prevents the insert 20, 20' from rotating with respect to the strap 16. Precise location and alignment of the pipes 12, 14 with the plumbing fixture is then easily established by disposing the pipes 12, 14 through the generally cylindrical inserts 20 and 20'. Such inserts 20, 20' can advantageously be used with metal pipes in cases where brazing or soldering procedures are inconvenient.

Figure 14:
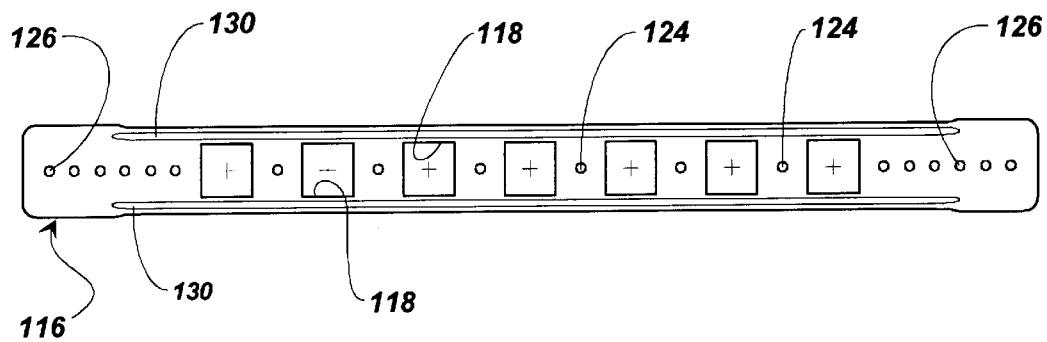
FIG. 14 is a perspective assembly view of a further embodiment of this invention.
Figure 15:
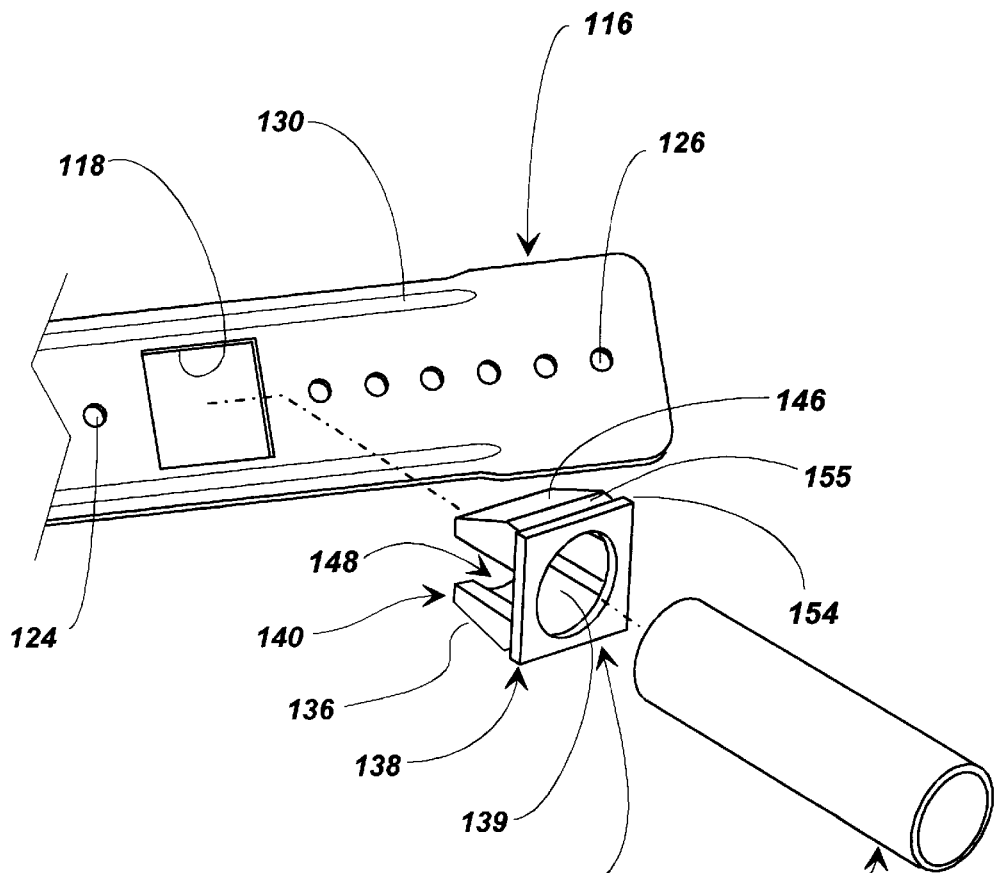
FIG. 15 is a perspective view of a strap for use with the embodiment of FIG. 14.

Referring to FIGS. 14–15, a further embodiment of this invention is shown in which the insert has a non-circular exterior shape and cooperates with a non-circular hole in the strap. For ease of reference, similar parts will have similar numbers incremented by 100. Thus, this further embodiment comprises a thin, elongated strap 116 with stiffening ribs 130 along opposing edges of the strap. The strap 116 has a first plurality of fastener holes 126 at opposing ends so the strap can be fastened to studs in a building structure. Alternating fastening holes 124 are interspersed with a plurality of strap openings 118 through which insert 120 is placed to connect to building members as appropriate.

The insert 120 has a non-circular exterior skirt 136 that cooperates with a non-circular strap opening 118 that has at least a portion corresponding to the non-circular portion of the skirt 136 so that the non-circular portions of holes 118 and insert 120 cooperate to restrain rotation of the insert 120 about the plane containing the hole 118 into which the insert 120 is placed. A square hole 118 is shown for illustration, although other non-circular shapes can be used. Shapes with flat sides are preferred, such as quadrilaterals, diamonds, rectangles, hexagonals etc. But curved, non-circular shapes are also believed suitable, as an oval. Combined curved and straight surfaces are also believed suitable, such as a circle with one or more flats on the periphery.

The skirt 136 of the insert 120 is modified according to the shape of the insert 120, but preferably has opposing projections 146 on opposite sides of the generally square exterior of the insert 120. Preferably the skirt 136 is separated into two opposing parts with a projection 146 on each part. Slots 146 separate the portions of the skirt 136. At least a portion of the exterior of the projections 146 increases in exterior dimension from a distal end 140 of the insert toward the proximal end 138 of the insert to form a ramp so that the opposing projections 146 or skirt 136 are urged toward one another as the insert 120 is inserted into opening 118. The proximal end of projections 146 have an inwardly inclined ramp 155 that decreases in exterior dimension toward the proximal end 138 and tapers toward a longitudinal axis of the insert 120. At the proximal end 138 of insert 120 is an outwardly extending projection 154 having a larger dimension than the corresponding dimension of hole 118 so the projection prevents the insert 120 from passing through the hole 118. For the depicted insert 120 the projection 154 takes the form of a generally square flange. The insert 120 has a hole 139 along a longitudinal axis of the insert through which pipe 114 is inserted. The interior portions of skirt 136 or projections 146 are configured to engage the pipe 114. The insert 120 is preferably made of resilient plastic.

In use, the strap 116 is located so that a hole 118 aligns with the desired location of pipes 114 in the building. The strap 116 is then fastened to spaced apart members of the building structure, such as studs, by placing fasteners through holes 126 that align with the studs. An insert 120 is then placed into the hole 118 so that the projections 146 align with correspondingly shaped portions of the non-circular hole 118. The distal end of the insert 120 is pushed through the hole causing the opposing portions of skirt 136 to resiliently deform inward toward one another and toward the longitudinal axis of the insert 120. The outwardly extending projection or flange 154 prevents the insert 120 from passing through the hole 118. The edge of the hole 118 rests on the inward inclined ramp 155 allowing the skirt portions 136 to move slightly outward from the longitudinal axis of the insert and urging the strap 116 toward the flange 154 to lock the insert 120 into the strap 116. In essence, the insert resiliently snaps into the hole 118.

A pipe 114 is then inserted into the hole 139 urging the skirt 136 and projections 146 outward, further locking the insert 120 to the strap 116 to restrain longitudinal movement of the insert and restraining rotation of the insert through the tab or tabs 22. The non-circular shape of the insert 120 cooperates with the non-circular mating portions of hole 118 to prevent rotation of the insert. If the thickness of the skirt 136 or projection 146 are selected appropriately, the insert 120 may tightly grip the pipe 114 to restrain movement of the pipe. Alternatively, after the pipe is connected to any appropriate piping in the structure, the pipe may be fastened to the insert 120 by adhesives, welding, melting, soldering, threaded fasteners, or other appropriate means of fastening that will vary with the material of the pipe 114 and insert 120. It is also possible to select the thickness of skirt 136 to provide a frictional connection by selecting the cavity size relative to the pipe outer diameter.

If the pipe 114 is previously installed in the structure, then after the strap 116 is installed the pipe will extend through one of the empty holes 118. An insert 120 is then slipped over the pipe 114 and forced through hole 118 to snap into place and surround the pipe. If desired, the pipe 114 may then be fastened to the insert 120 to ensure movement of the pipe is restrained.

The insert 120 restrains lateral movement of the pipe in the plane containing the hole 118 through which the insert and pipe are inserted. The flange 154 and projection 146 restrain motion perpendicular to that plane and along the longitudinal axis of the insert 120. The non-circular shape of the insert 120 and hole 118 restrain rotation of the insert in that plane. Advantageously, but not necessarily, the frictional connection between the pipe 114 and the insert 120 is sufficient to restrain rotation of the pipe in that plane and to restrain movement of the pipe orthogonal to that plane, along the longitudinal axis of the insert 120 and pipe 114 extending through the hole 118. As desired, the pipe 114 and insert 120 may be fastened as previously described relative to pipes 12, 14 and insert 20.

The basic principles of the construction and function of this alternative embodiment are similar to those of the insert shown and described in FIGS. 1–13. In one sense, the holes in the strap are always non-circular or have a non-circular periphery because of the projections or tabs 22 in some embodiments, and because of the square, multi-lateral or non-circular holes in other embodiments. The shape of the holes cooperates with the shape of the insert to prevent movement of the insert in three orthogonal axes one of which aligns with the longitudinal axis through the hole, and to prevent rotation of the insert relative to the strap in at least the plane that contains the hole through which the insert is placed.

The embodiment of insert 120 has the advantage of not requiring tabs or projections 22 (FIG. 2) which could damage the pipe if the projections come into contact with the pipe with sufficient force or for a sufficient time. In all embodiments an insert cooperates with the shape of the hole in the strap to restrain movement of the insert. The insert is either sized to grip and hold the pipe placed through the insert, or the insert is fastened to the pipe, in order to hold the pipe against movement in selected directions or against rotation about selected axes. Advantageously, the insert and pipe are restrained from moving about three orthogonal axes, and from rotation about those orthogonal axes.

There is thus advantageously provided a means for connecting a pipe to a strap which strap is further connected to a building structure, so that movement of the pipe is restrained in translation along three orthogonal axes and is restrained in rotation at least in the plane of the strap and preferably restrained from rotation about the three orthogonal axes.

Figure 16A:
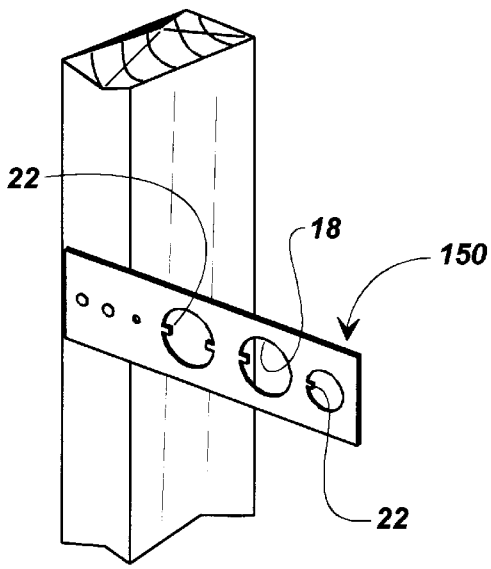
FIGS. 16a–16d are perspective views of alternative embodiments of pipe supports.
Figure 16B:
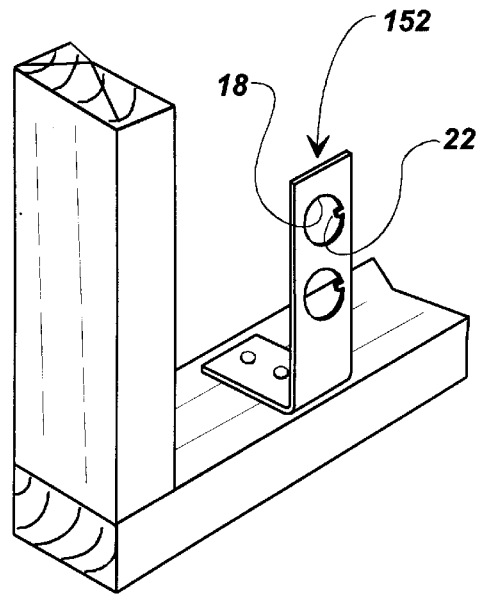
Figure 16C:
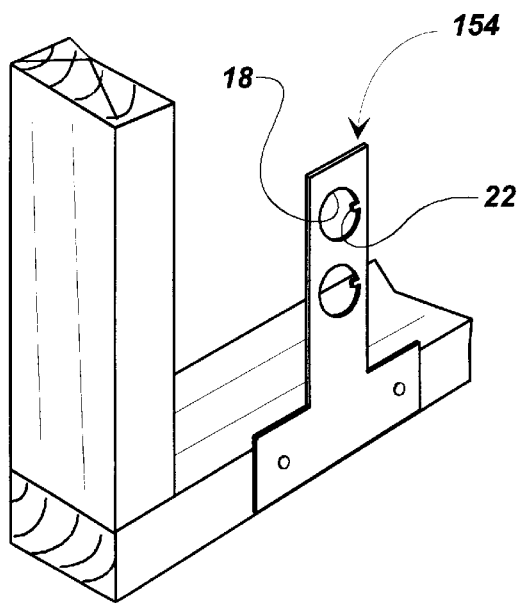
Figure 16D:
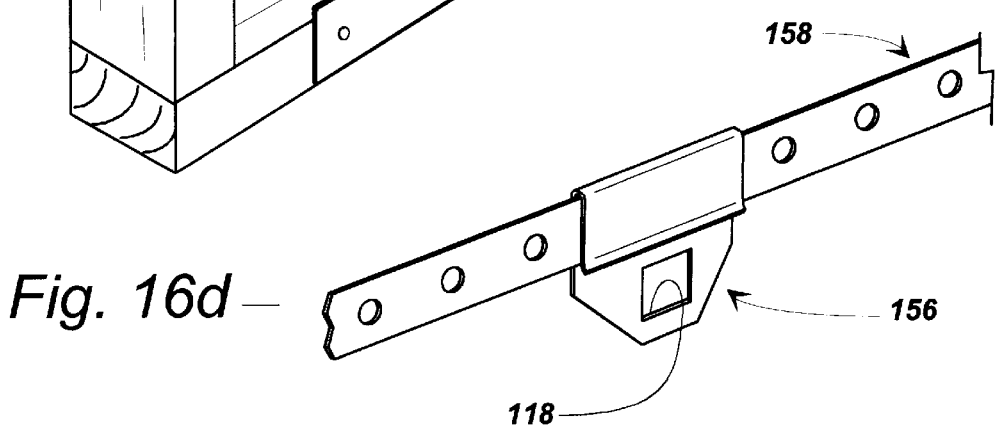

The above embodiments show the inserts 20, 120 used with holes 18, 118 that are formed in a strap 16, 116 that extends between structural members in a building, such as studs. The inserts 20, 120 may be used with holes 18, 118 formed in any support suitable for locating a plumbing pipe in position. Thus, various prior art supports could be modified to have holes 18, 118, to form such pipe supports as a strap 150 cantilevered from a building support as shown in FIG. 16a, an "L" shaped bracket 152 as shown in FIG. 16b, a "T" bracket 154 as shown in FIG. 16c, or a clip 156 suspended from a member 158 as shown in FIG. 16d. Various sizes of one or more holes 18, 118, and various combinations of shapes, can be placed in the supports 16, 116, 150, 152, 154 and 156.

Figure 17:
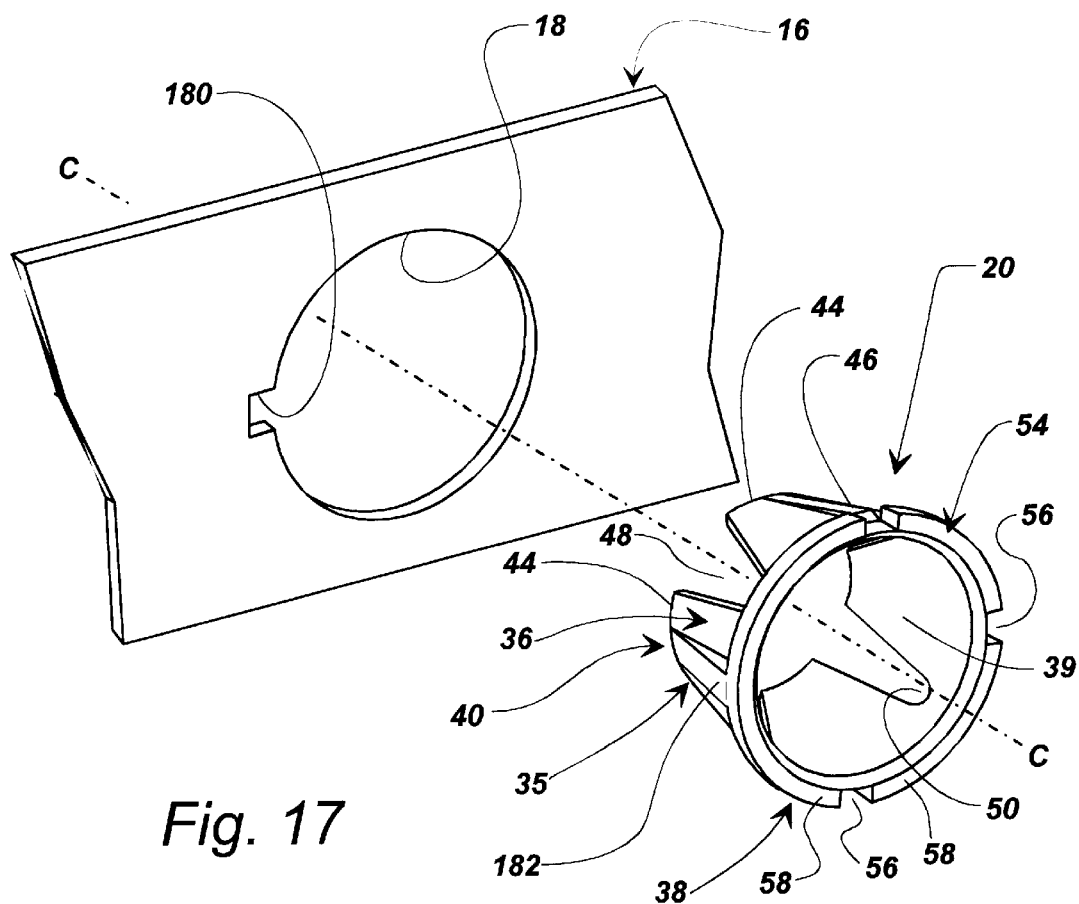
FIG. 17 is a perspective view of an alternative embodiment having a rib on the insert and a recess in the support.
Figure 18:
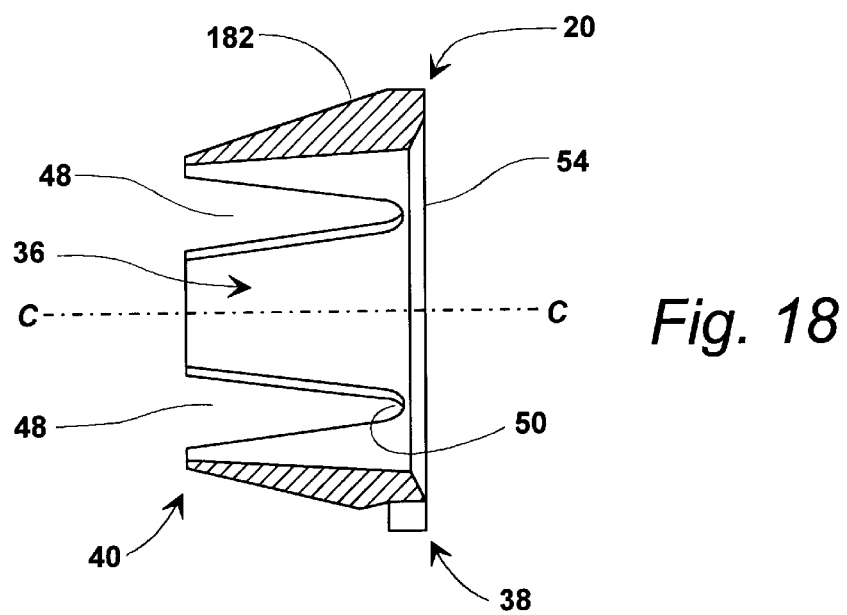
FIG. 18 is a cross-sectional view of the insert of FIG. 17 the insert and a recess in the support.

In the above embodiments the tabs 22 are shown on the holes 18. Referring to FIG. 17a–c, given the above disclosure, one skilled in the art could devise suitable ways to replace the tab 22 with one or more notches or recesses 180 in the periphery of the hole, cooperating with a projecting rib 182 on insert 22, to restrain rotation of the insert. Advantageously, the rib 182 could be tapered to make it easier to align the rib 182 with the recess 180. Thus, the distal end of rib 182 would be smaller than the proximal end of the rib. The rib 182 is shown as generally rectangular in cross section, but various cross-sectional shapes could be devised. Likewise, the recess 180 is shown as rectangular in shape, but various shapes could be devised. The shape of the notch 180 preferably corresponds to the cross-sectional shape of the rib 182, but that is not essential, and hence the shape of the notch 180 could differ from the cross-sectional shape of the rib 182. As shown in FIG. 17c, the rib 182 may be the same radial distance from the centerline as the flange 54. But the rib 182 need only project sufficiently beyond the periphery of skirt 36 to engage the recess 180 sufficiently to restrain rotation of the insert 20. The skirt 36 is advantageously still slotted to allow the distal end 40 of inert 20 to be deformed radially inward toward centerline C—C so the distal end 40 to be inserted in to hole 18 in one of the various supports, such as support 16.

It will be understood that the above-described arrangements of apparatus and the methods therefrom are merely illustrative of applications of the principles of this invention and many other embodiments and modifications may be made without departing from the spirit and scope of the invention as defined in the claims.

What is claimed is:

1. An apparatus for holding pipes in a building structure, comprising:

a support fastenable to a building structure and having a plurality of openings spaced along the support at preset distances, at least one of the support openings having at least one tab extending from an edge of the opening toward the interior of the opening;

an insert placed into one of the support openings with the tab, the insert having a skirt with distal and proximal ends and a flange at the proximal end, the flange being larger than the support opening into which the insert is placed, the skirt and flange defining an insert aperture sized to accept a pipe inserted through the insert aperture, one end of the insert being inserted through the support opening, the insert having has at least one slot with sides configured to engage the tab on the support to prevent the insert from rotational movement relative to the tab.

2. An apparatus as defined in claim 1, wherein the distal end of the skirt is resiliently movable in a radial direction to restrain movement of the insert relative to the support in at least one direction substantially parallel to a longitudinal axis of the pipe extending through the support opening.

3. An apparatus as defined in claim 1, wherein the insert aperture is substantially circular in cross-section and has an inner diameter at the proximal end approximately equal to the outer diameter of the pipe insertable through the insert aperture.

4. An apparatus as defined in claim 1, wherein the skirt has four slots disposed between four prongs, with each prong configured to form the sides of the slot that engage the tab to prevent the insert from rotational movement relative to the tab.

5. An apparatus as defined in claim 1, wherein the skirt has a thickness that defines an insert aperture corresponding to the outer diameter of a pipe inserted through the aperture.

6. An apparatus as defined in claim 5, wherein the skirt is fastened to the pipe.

7. A plumbing apparatus for locating and supporting a plumbing pipe in a building, comprising:

a support with at least one opening for receiving and spacing a pipe relative to a building structure;

insert means insertable into the opening to hold the pipe in the support, the insert means having an anti-rotation means cooperating with anti-rotation means on the support opening to constrain movement of the pipe relative to the support and to restrain rotation of the insert relative to the support about a longitudinal axis of the pipe as it extends through the opening.

8. A plumbing apparatus as defined in claim 7 wherein the insert means comprises an insert with an non-circular exterior.

9. An apparatus to hold and locate plumbing pipes in a building, comprising:

a support having a plurality of holes through which plumbing pipes can be inserted, at least one of the holes having a tab extending into the hole;

an insert having a distal end and proximal end with a generally cylindrical aperture extending along a longitudinal axis of the insert between the distal and proximal ends with the size of the aperture being selected to correspond to about the size of the plumbing pipe to be inserted into and held by the insert, the insert having at least one slot extending from the distal end toward the proximal end, with the end of the slot adjacent the proximal end of the insert being sufficiently large to accommodate the insertion of the tab on the support into the slot so the tab and slot can cooperate to limit rotation of the insert about the longitudinal axis, the distal end being resiliently deformable with a portion larger than the hole and configured to compress enough to fit through the hole and then expand to restrain withdrawal of the insert through the hole.

10. An apparatus as defined in claim 9, wherein the distal end of the insert is resiliently deformable in a radial direction relative to the longitudinal axis and sized so the distal end may be passed through a hole in the support to hold a pipe.

11. An apparatus as defined in claim 9, wherein the insert has at least first and second radially extending portions located on the insert so the portions are on opposite sides of the support when the insert is installed in a hole in the support to restrict motion of the insert along a longitudinal axis of the insert.

12. An apparatus as defined in claim 9, wherein there are a plurality of slots having a closed end toward the proximal end of the insert and an open end at the distal end of the insert, and wherein the width of the slot at the distal end is greater than the width of the slot at the proximal end.

13. An apparatus as defined in claim 9, wherein the support is of sufficient length to extend between two studs in a building.

14. An apparatus as defined in claim 13, wherein the insert is fastened to a pipe inserted through the aperture in the insert.

15. A plumbing device to support and locate pipes in building structures, comprising:

a support having holes through which pipes are inserted, at least one of the holes having a tab extending radially inward from a periphery of the hole;

an insert having a tubular skirt with a proximal end and a distal end and a projection at the proximal end extending radially outward from the skirt, the skirt having a plurality of slots that open to the proximal end and extending toward the distal end where the slots terminate in a proximal end, the slots having a width sufficient to allow the tab to fit within at least a portion of the slot, the skirt having an inner diameter corresponding to a pipe diameter to be inserted through said at least one of said holes, the skirt having an outer diameter sized to be inserted into said at least one of said holes having a tab by moving at least one portion of the distal end of the skirt radially inward, with the radial outward projection being larger than the diameter of the skirt.

16. A plumbing device as defined in claim 15, wherein the distal end of the slot is wider than the proximal end of the slot and wherein the proximal end of the slot has a portion about the same width as the tab.

17. A plumbing device as defined in claim 15, wherein the distal end of the insert is placed through the hole in the support, and wherein a pipe is inserted through the inside of the insert, the tab cooperating with at least one slot to prevent rotation of the insert and the radially outward projection cooperating with the support to prevent passage the insert through the hole.

18. A plumbing device for supporting and locating pipes in building structures, comprising:

a support having a plurality of holes spaced at predetermined locations and sized to fit over a pipe to be held, the support having a tab extending inward from the periphery of at least one of the holes toward the center of the hole; and an insert placed into the hole with the tab, the insert having a tubular skirt with distal and proximal ends and an opening extending from the distal end toward the proximal end, the opening having sides that cooperate with the tab to prevent rotation of the insert in a plane containing said hole and said tab, the insert having a radially extending projection on its proximal end to prevent the insert from passing through the hole.

19. A plumbing device as defined in claim 18, wherein the skirt has a thickness selected to provide an inner diameter corresponding to about the size of a pipe to be inserted through said one of the holes, and an exterior shape that is not generally cylindrical.

20. A plumbing device for restraining pipes in a building structure, comprising a support having a plurality of holes spaced at predetermined distances along the length of the support and spaced to accommodate the location of pluming pipes with the holes being sized to allow the passage of the plumbing pipes through the holes and to allow the passage of an insert that encircles the pipe within the hole, the support having at least one tab extending inward toward a center of the hole; and an insert placed through one of the holes in the support, the insert having a central aperture with sides that cooperate with the tab to prevent rotation of the insert in a plane containing the hole through which the insert is placed, the insert further having a projection extending radially outward and cooperating with the support to prevent passage of the insert completely through the hole into which the insert is placed, and a pipe placed through the central aperture of the insert with the aperture being about the same size as or slightly smaller than an outer diameter of the pipe, the sides of the insert being resiliently deformable to expand after insertion through the hole to a size larger than the hole to restrain movement of the insert back through the hole.

21. A plumbing device as defined in claim 20, wherein the support further comprises a rectangular, flat strip of sufficient length to extend between adjacent studs in a building, with longitudinal edges generally parallel to a longitudinal axis of the support, and a strengthening rib adjacent each of the edges.

22. A plumbing device to support and locate pipes in building structures, comprising:

a support having a plurality of holes with a non-circular periphery through which pipes are inserted to hold and locate the pipes;

an insert having a longitudinal axis with a distal end configured to fit through one of the holes by resiliently deforming to fit through said one of the holes and thereafter expanding to be larger than said one of the holes, the insert having a proximal end with a projection extending in a direction orthogonal to the axis a distance sufficient to contact the strap and prevent the insert from passing through said one of the holes, the insert having a shape configured to cooperate with the non-circular periphery of said one of the holes to restrain rotation of the insert relative to the strap in the plane containing said one of the holes, the insert forming a longitudinal cavity along the axis of sufficient size to allow passage of a selected one of the pipes, and wherein the non-circular periphery comprises one of a tab extending toward the longitudinal axis or a recess in the periphery extending away from the longitudinal axis, and wherein the shape of the insert comprises one of a recess in the insert configured to accept the tab or a projection on the recess configured to fit in the recess in the non-circular periphery.

23. A plumbing device as defined in claim 22, wherein said one of the holes is square and the insert has an exterior configuration having at least one flat portion configured to cooperate with one side of the square to restrain rotation of the insert relative to the support.

24. A plumbing device as defined in claim 22, wherein said one of the holes has a tab extending toward the center of said one of the holes and the insert has a slot opening to the distal end and extending toward the proximal end, with the slot having edges configured and located to cooperate with the tab to restrain rotation of the insert relative to the support when the insert is placed into said one of the holes.

25. A plumbing device as defined in claim 22, wherein the distal end of the insert is placed through said one of the holes in the support, and wherein a pipe is inserted through the cavity in the insert.

26. A plumbing device for supporting and locating pipes in building structures, comprising:

an support having opposing edges and ends with a first plurality of holes spaced at predetermined distances along at least a portion of the support, with at least one of the holes having a tab extending toward the center of the hole, the support being deformed along its length adjacent at least one edge in order to stiffen the support, the support having flattened ends with a second plurality of holes in each of the ends sized to accommodate a fastener to fasten the support to the building support; and an insert placed into one of the non-circular holes with the tab, the insert having a tubular skirt with distal and proximal ends and an opening extending from the distal end toward the proximal end, the opening having sides that cooperate with the tab to prevent rotation of the insert in a plane containing said one of the holes, the insert having a radially extending projection on its proximal end to prevent the insert from passing through the hole into which the insert is placed, the distal end having a portion that is larger than the hole but that is resiliently deformable to fit through the hole.

27. A plumbing device as defined in claim 26 wherein the holes are generally circular.

28. A plumbing device as defined in claim 27, wherein a plurality of the holes have a generally square shape, and wherein the insert has at least one flat portion cooperating with one side of the square hole to restrain rotation of the insert relative to the strap in the plane containing the hole into which the insert is placed, the insert forming a longitudinal cavity along the axis of sufficient size to allow passage of a selected one of the pipes.

29. A plumbing device as defined in claim 28, wherein a pipe is inserted through the opening and fastened to the insert.

30. A method of locating and supporting pipes in a building structure, comprising the steps of:

fastening a support to a building structure, where the support is formed with at least one opening spaced along the support at a predetermined location and formed has at least one tab protruding into the opening toward the interior of the opening;

inserting a distal end of an insert through said one hole with the tab until a radially extending portion toward the proximal end of the insert abuts the support and prevents further insertion of the insert through that hole, the insert having a longitudinal axis with an aperture along that axis; and placing the tab on the hole through which the insert is inserted into a slot in the insert to restrain rotation of the insert about the longitudinal axis.

31. A method as defined in claim 30, comprising the further step of configuring the aperture in the insert to be about the same size as or slightly larger than an outer diameter of a pipe and inserting that pipe through the aperture in the insert.

32. A method as defined in claim 30, wherein the step of inserting the pipe further comprises radially expanding a portion of the insert so the distal end of the insert will not pass through the hole through which the insert was inserted.

33. A method as defined in claim 30, comprising the further step of varying the thickness of the insert to accommodate pipes of different diameters.

34. A method of restraining plumbing pipes in a building by inserting pipes through holes in a strap, comprising the steps of:

forming at least one non-circular hole in the strap sufficient, forming an insert with a longitudinal axis and a distal end configured to fit through one of the holes, forming a projection on the proximal end of the insert with the projection extending in a direction orthogonal to the axis a distance sufficient to contact the strap and prevent the insert from passing through said one of the holes, selecting the shape of the insert to cooperate with the non-circular periphery of said one of the holes to restrain rotation of the insert relative to the strap in the plane containing said one of the holes, forming a longitudinal cavity along the axis of sufficient size to allow passage of the pipes, and placing the insert on the pipe to interpose the insert between the pipe and the strap, and wherein the distal end of the insert is larger than said one of the holes but resiliently movable inward to pass through said one of the holes and to expand outward after being inserted through said one of the holes to restrain movement of the insert relative to the strap in at least one direction substantially parallel to a longitudinal axis of the pipe extending through the hole.

35. A method as defined in claim 34, comprising the step of forming the non-circular holes to be square and forming the with an exterior configuration having at least one flat portion configured to cooperate with one side of the square to restrain rotation of the insert relative to the support when the insert is placed into the square hole.

36. A method of restraining plumbing pipes in a building by inserting pipes through hole in a strap, comprising the steps of forming at least one non-circular hole in the strap forming an insert with a longitudinal axis and a distal end configured to fit through one of the holes, forming a projection on the proximal end of the insert with the projection extending in a direction orthogonal to the axis a distance sufficient to contact the strap and prevent the insert from passing through said one of the holes, selecting the shape of the insert to cooperate with the non-circular periphery of said one of the holes to restrain rotation of the insert relative to the strap in the plane containing said one of the holes, forming a longitudinal cavity along the axis of sufficient size to allow passage of the pipes, and placing the insert on the pipe to interpose the insert between the pipe and the strap, forming one of the non-circular holes to have a tab extending toward the center of said one of the holes and forming the insert with a slot opening to the distal end and extending toward the proximal end, and forming the slot with edges configured and located to cooperate with the tab to restrain rotation of the insert relative to the strap when the insert is placed into said one of the holes.

37. An apparatus for holding pipes in a building structure, comprising:

a strap fastenable to a building structure and having a plurality of openings spaced along the strap at preset distances, each of the strap opening having a periphery defining the opening;

an insert placed into one of the strap openings, the insert having a skirt with distal and proximal ends and a flange at the proximal end, the flange being larger than the strap opening into which the insert is placed, the skirt and flange defining an insert aperture sized to accept a pipe inserted through the insert aperture, one end of the insert being inserted through the strap opening, one of the opening and insert having a projecting member and the other of the opening and insert having a recess configured to receive the projecting member when the insert is placed in the opening with the projection inserted into the recess, the projecting member engaging the recess to restrain the insert from rotational movement in a plane containing the strap opening through which the insert is inserted.

38. An apparatus as defined in claim 37, wherein the end of the insert inserted through the strap opening is larger than the opening but resiliently deformable sufficiently to fit through the opening whereupon it expands to larger than the opening to restrain removal of the insert from the opening.

39. An apparatus as defined in claim 38, wherein the projection extends from the periphery of the opening into the opening and the recess is formed in the insert.

40. An apparatus as defined in claim 38, wherein the projection extends from the insert toward the periphery of the opening and the recess is formed in the strap and extends from the periphery of the opening away from the insert.

41. An apparatus as defined in claim 38, wherein there are a plurality of projections and a plurality of recesses.

42. An apparatus as defined in claim 38, wherein the distal end of the skirt is resiliently moveable in a radial direction to restrain movement of the insert relative to the support in at least one direction orthogonal to a plane containing the opening in the strap through which the insert is inserted.

43. An apparatus as defined in claim 38, wherein the skirt has a thickness that is selected to define an insert aperture sized to accept the pipe inserted through the insert aperture.

* * * * *